United States Patent [19]

Suraniti et al.

[11] Patent Number: 5,628,967
[45] Date of Patent: May 13, 1997

[54] METHOD AND A DEVICE FOR MONITORING THE INTERNAL CIRCULATION IN A FLUIDIZED BED REACTOR, AND A REACTOR PROVIDED WITH SUCH A DEVICE

[75] Inventors: Silvestre Suraniti, Paris; Jean-Xavier Morin, Neuville Aux Bois, both of France

[73] Assignee: GEC Alsthom Stein Industrie, Velizy-Villacoublay, France

[21] Appl. No.: 499,912

[22] Filed: Jul. 11, 1995

[30] Foreign Application Priority Data

Jul. 28, 1994 [FR] France ................... 94 09365

[51] Int. Cl.[6] ................................................. B01J 8/18
[52] U.S. Cl. ................ 422/139; 422/145; 422/82.12; 422/111; 73/861.95
[58] Field of Search ................ 422/139, 145, 422/82.12, 99, 111, 129; 73/861.95; 122/4 D; 427/459, 185, 213; 34/10, 57 A

[56] References Cited

U.S. PATENT DOCUMENTS

| | | | |
|---|---|---|---|
| 3,802,264 | 4/1974 | Poppendick et al. | 73/204 |
| 4,167,819 | 9/1979 | Ebeling, Jr. et al. | 34/10 |
| 4,336,227 | 6/1982 | Koyama et al. | 422/139 |
| 4,546,012 | 10/1985 | Brooks | 427/213 |
| 4,552,203 | 11/1985 | Chrysostome et al. | 422/145 |
| 5,026,171 | 6/1991 | Feller | 73/861.95 |

FOREIGN PATENT DOCUMENTS

| | | |
|---|---|---|
| 3006754 | 8/1980 | Germany . |
| WO9103316 | 3/1991 | WIPO . |

OTHER PUBLICATIONS

*Patent Abstracts of Japan*, vol. 13, No. 365 (M–859) 15 Aug. 1989 & JP-A-01 121 616 (Sanki Engineering Co., Ltd.) 15 May 1989.

*Primary Examiner*—Christopher Kim
*Attorney, Agent, or Firm*—Sughrue, Mion, Zinn, Macpeak & Seas

[57] ABSTRACT

A monitoring device for continuously monitoring the internal circulation flow-rate of solid particles in a circulating fluidized bed reactor including a bottom zone into which the fluidization gas is injected, and a top zone surrounded by walls. The device includes a sampling tank for sampling internal circulation solids, which tank is fixed against one of the walls of the reactor and is provided with a fluidization device. A removal pipe is provided for removing the solids from the tank and conveying them to a measuring device for measuring the flow-rate of the solids. A return pipe is provided for returning the solids from the measuring device to the inside of the reactor.

15 Claims, 7 Drawing Sheets

METHOD AND A DEVICE FOR MONITORING THE INTERNAL CIRCULATION IN A FLUIDIZED BED REACTOR, AND A REACTOR PROVIDED WITH SUCH A DEVICE

FIELD OF THE INVENTION

The present invention relates to a method and a device for monitoring the internal circulation in a fluidized bed reactor, and to a reactor provided with such a device.

More precisely, the invention relates to a method and a device for monitoring the internal circulation flow-rate of solid particles in a circulating fluidized bed including a bottom zone into which the fluidization gas is injected, and a top zone surrounded by walls.

BACKGROUND OF THE INVENTION

In a reactor having a circulating fluidized bed, some of the solids exit from the reactor and provide external circulation, while some of the solids descend along the inside surfaces of the walls so as to provide the "internal" circulation. The magnitude of the flow-rate of the internal circulation depends mainly on the charge of solids inside the reactor, and on the fluidization conditions.

OBJECTS AND SUMMARY OF THE INVENTION

No device exists for monitoring the flow-rate of the internal circulation by continuously measuring said flow-rate. The present invention provides such a device.

According to the invention, the method consists in continuously and locally measuring the flow-rate of solids running down along said walls.

According to the invention, the monitoring device for continuously monitoring the internal circulation flow-rate of solid particles in a circulating fluidized bed, for implementing this method, comprises:

a sampling tank for sampling internal circulation solids, which tank is fixed against one of said walls of the reactor and is provided with fluidization means;

a removal pipe for removing said solids from said tank and conveying them to a measuring device for measuring the flow-rate of said solids; and a return pipe for returning said solids from the measuring device to the inside of the reactor.

Such a monitoring device enables differences in the internal circulation flow-rate of the solid particles to be detected at various places in a circulating fluidized bed reactor. In this way, it is possible to detect phenomena of abnormal concentrations, e.g. "chimney stack effects" or non-uniform concentrations in the various compartments of the reactor. In this way, the appropriate measures can be taken, e.g. the fluidization gas feed to the compartment(s) in question can be adjusted.

Preferably, the measuring device for measuring the flow-rate is disposed outside the reactor.

In a preferred embodiment, the flow-rate measuring device comprises:

a first temperature measuring device for measuring the temperature of the solids at the output of the sampling tank;

a cooling device for cooling the solids; and a second temperature measuring device for measuring the solids at the output of the cooling device.

The invention further provides a cooling device designed to constitute the monitoring device, comprising a removal pipe which slopes downwards, which has a longitudinal axis x—x, which is provided with a lining of refractory material, which receives solid particles at its top, and which is associated with a cooling facility comprising, in a solid-receiving tank, a set of heat-exchange tubes through which a cooling fluid flows and an air-feed assembly enabling the solid particles to flow; according to the invention the solid-receiving tank is constituted by said pipe which slopes at at least 5 degrees relative to a horizontal plane.

Preferably, said pipe slopes at an angle in the range 5 degrees to 20 degrees.

Advantageously, the set of heat-exchange tubes is constituted by tubes that are disposed parallel to axis x—x in the pipe.

Said pipe may be provided with a retaining wall for retaining solid particles, which wall is situated downstream from the set of heat-exchange tubes, and is advantageously a transverse wall that is extractable.

To this end, said retaining wall is made up of superposed elongate elements that are removable.

The heat-exchange tubes are coaxial pairs of tubes, both the inlet and the outlet for the cooling fluid being situated at the same end of the pipe.

The air-feed assembly comprises nozzles passing through the bottom of the pipe and fed via a compartmentalized manifold situated under the pipe.

The invention further provides a temperature measuring device for measuring the temperature of a flow of solids, which device forms the second measuring device included in the monitoring device. It comprises:

temperature-determination probes at a plurality of heights up the retaining wall; and a temperature-determination probe disposed downstream from said retaining wall in an extension of the pipe, which extension is provided with fluidization nozzles.

Finally, the invention also provides a reactor provided with at least one monitoring device; it includes a plurality of monitoring devices distributed over its inside periphery, the devices being disposed at the same height.

In a preferred embodiment of the reactor, which includes internal bubbling beds communicating with the inside of the reactor via their tops which receive solid matter falling down along the walls of the top zone, and which return the solid matter in part to the bottom zone by it overflowing over the entire lengths of walls acting as overflow walls or "weirs", at least some of the monitoring devices have their respective sampling tanks formed by respective compartments of the internal bed(s).

BRIEF DESCRIPTION OF THE DRAWINGS

A preferred embodiment of the invention is described below in more detail with reference to the accompanying drawings, in which.

DETAILED DESCRIPTION OF THE INVENTION

Figure 1:
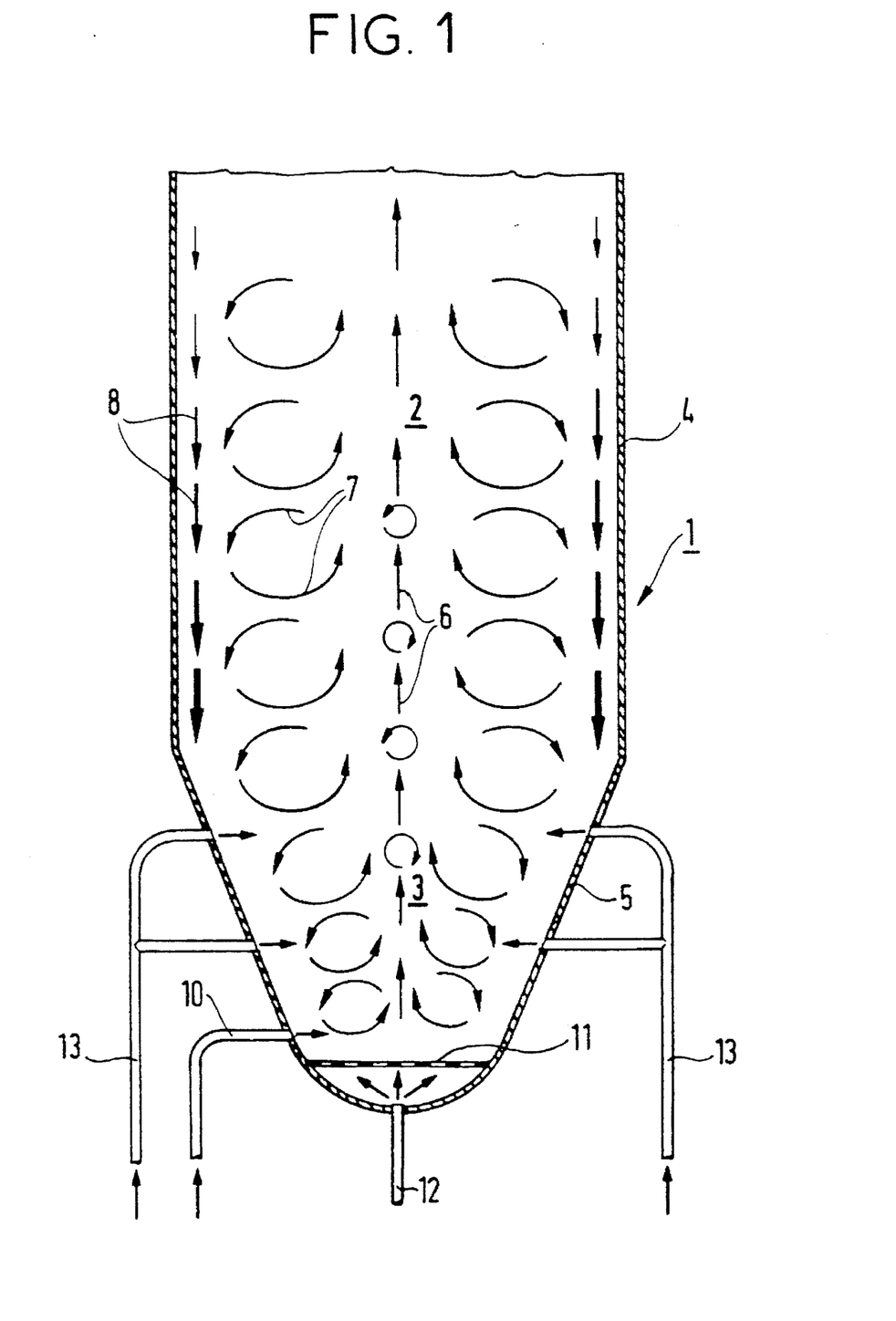
FIG. 1 is a vertical section view of a circulating fluidized bed reactor.

FIG. 1 corresponds to conventional circulating bed reactor operation. The circulating bed reactor includes a bottom zone 3 that flares towards the top and a rectangular top zone 2. The bottom zone 3 is provided with a fluidization grate 11, primary air-injection means 12 below the grate 11, secondary air-injection means 13 above the grate 11, and fuel-feed means 10. The walls 5 surrounding the bottom zone 3 are provided with heat-exchange tubes. The top zone 2 is also surrounded by walls 4 that are provided with heat-exchange tubes.

The solid particles rise up above the grate 11 towards the top of the reactor as represented by arrows 6. The particles tend to diverge towards the walls 4, 5 and to fall back down towards the bottom. However, a portion of the finest particles is re-entrained towards the top, in eddying movements such as 7. The other particles move towards the walls 4, 5 and run down along them towards the bottom as represented by arrows 8.

Figure 2:
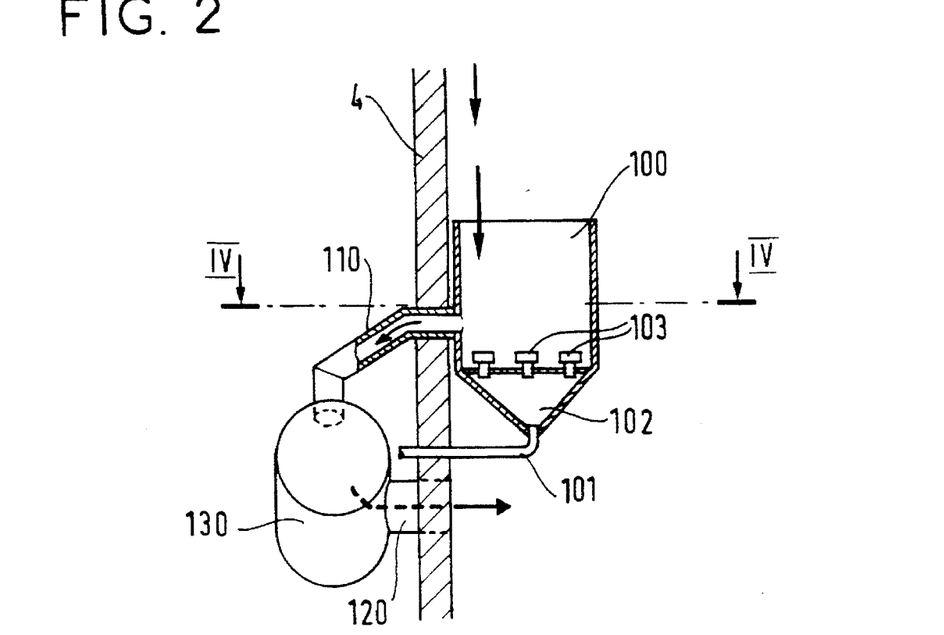
FIG. 2 is a vertical section view of a monitoring device of the invention.
Figure 3:
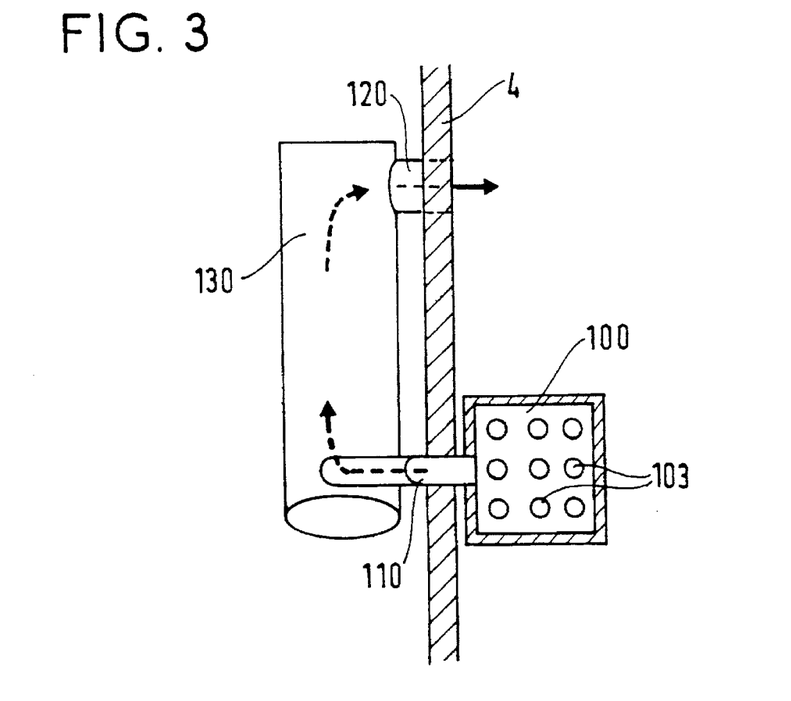
FIG. 3 is a section view on IV—IV of FIG. 2.

A preferred embodiment of the monitoring device of the invention for continuously monitoring the internal circulation flow-rate of the solid particles is shown in FIGS. 2 and 3.

It comprises:

a sampling tank 100 for sampling internal circulation solids, which tank is fixed against one of said walls 4 of the reactor and is provided with fluidization means constituted in a manner known per se by a fluidization gas feed pipe 101 connected to an "air box" chamber 102 feeding nozzles 103 distributed over the bottom or floor of the tank 100; the fluidization is set as a function of the pressure difference in the tank 100, so as to prevent any overflowing thereof; the tank is preferably made of refractory steel;

a removal pipe 110 for removing said solids from said tank 100 and conveying them to a measuring device 130 for measuring the flow-rate of said solids, which measuring device is disposed outside of the reactor; and a return pipe 120 for returning said solids from the measuring device 130 to the inside of the reactor.

Figure 4:
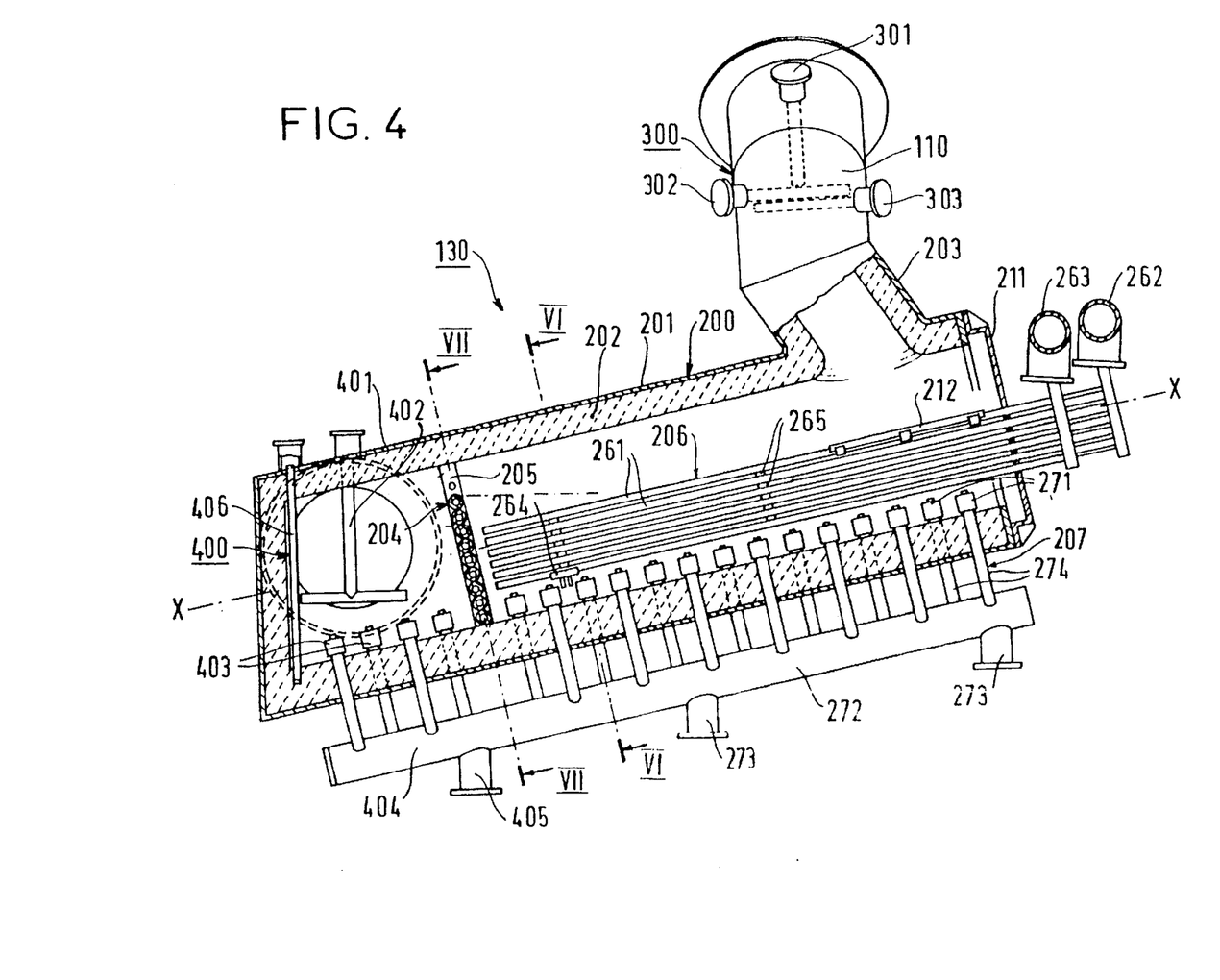
FIG. 4 is a longitudinal section view of a cooling device of the invention.

A preferred embodiment of the flow-rate measuring device 130 is shown in FIG. 4. It comprises:

a first temperature measuring device 300 for measuring the temperature of the said solids at the output of the tank 100;

a cooling device 200 for cooling the solids; and a second temperature measuring device 400 for measuring the solids at the output of the cooling device 200.

As shown in FIG. 4, the cooling device of the invention includes a pipe 201 which slopes downwards at an angle in the range 5 degrees to 20 degrees relative to a horizontal plane, which has a longitudinal axis x—x, which is provided with a refractory lining 202 providing thermal insulation and mechanical protection, and which receives hot solid particles at its top via an inlet duct 203.

The sloping pipe 201 is provided with a fluidization assembly 207 for fluidizing the solid particles, and with a transverse retaining wall 204 for retaining the solid particles. In this way, a fluidized tank for receiving the solid particles is formed inside the pipe 201 between the inlet duct 203 and the wall 204. The wall 204 extends over a portion only of the inside cross-section of the pipe 201 and it delimits a passage 205 at its top via which the particles can be removed.

The retaining wall 204 is extractable and is made up of superposed elongate elements that are removable as described below with reference to FIG. 6.

A cooling facility is disposed in the solid-receiving tank, which facility comprises a set of heat-exchange tubes 206 through which a cooling fluid flows.

The set of heat-exchange tubes 206 is made up of tubes 261 extending parallel to the axis x—x and disposed upstream from the transverse wall. The heat-exchange tubes 261 are coaxial pairs of tubes, the inlet 262 and the outlet 263 for the fluid being situated at the same end of the tube 201, namely on the outside of the higher end wall 211 of the pipe 201. Advantageously, the set of tubes 206 is also secured to the higher end wall 211 of the pipe 201. In this way, by removing this end wall 211 while the reactor is stopped, the set of heat-exchange tubes 206 may be removed and, if necessary, maintained or repaired. In order to hold in place the resulting cantilevered set of tubes, a holding device 264 is provided in the vicinity of that end of the set of tubes 261 which is closer to the retaining wall 204.

The top heat-exchange tubes 261 are protected by metal shields 212 facing the inlet duct 203.

The set of heat-exchange tubes 206 is described in more detail below with reference to FIG. 5.

The fluidization assembly 207 comprises nozzles 271 which pass through the pipe 201 at the bottom of the solid-receiving tank formed in this way, and which are fed via a manifold 272 situated under the pipe 201. Depending on the length of the solid-receiving tank, a plurality of manifolds 272 may be provided. The fluidization gas is injected into the manifolds 272 via inlets 273.

Figure 5:
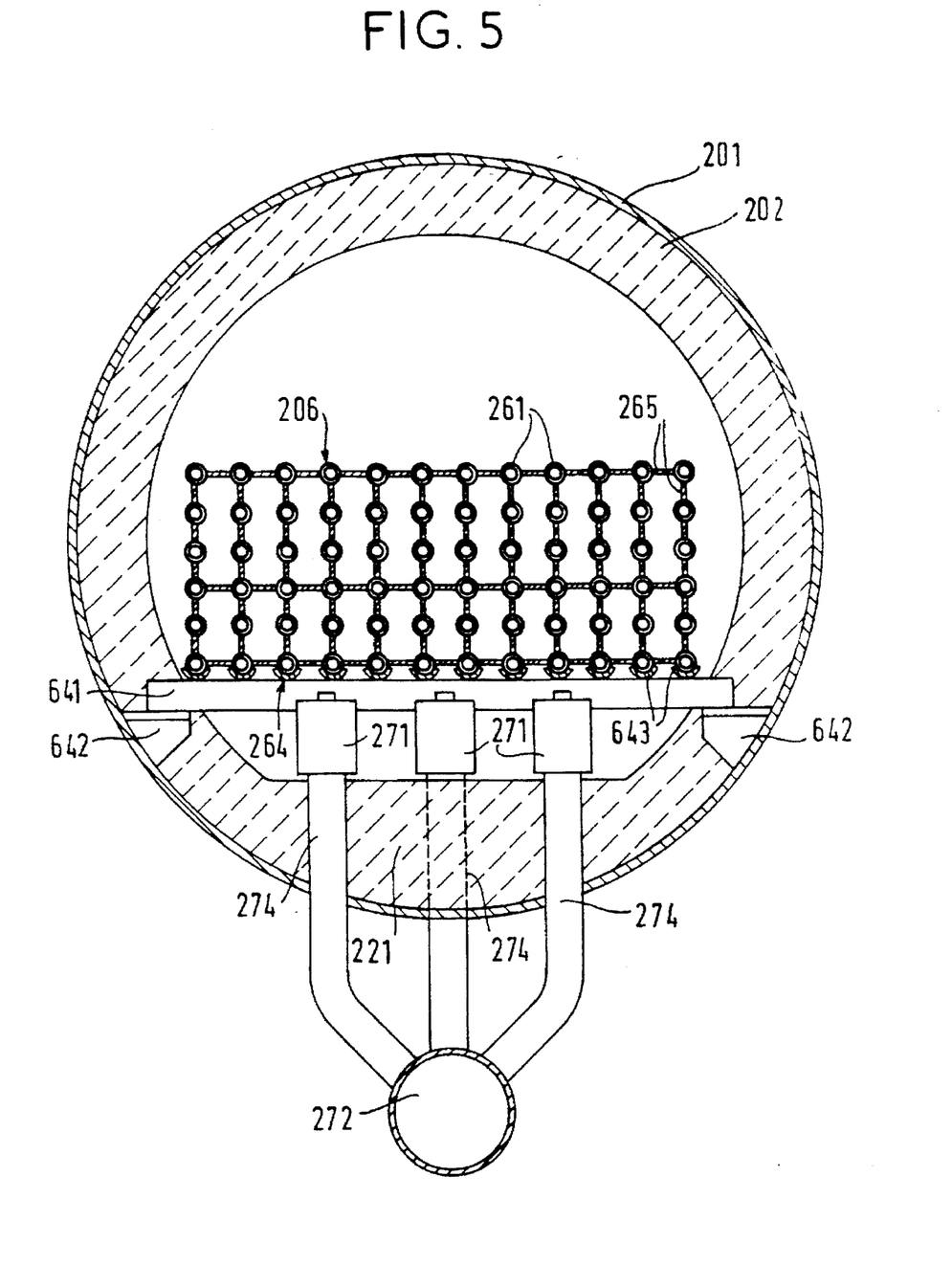
FIG. 5 is a section view on VI—VI of FIG. 4.

As shown in FIG. 5, the set of heat-exchange tubes 206 comprises a certain number of tubes 261 disposed parallel to one another, and held by welded fins 265 distributed transversely and longitudinally so as to form a rigid assembly of tubes. In the vicinity of the cantilevered-out end, a holding device 264 is provided constituted by a cross-piece 641 which is fixed to two brackets 642 welded to the outer metal casing of the pipe 201, and which supports cradles 643 in which the bottom tubes of the set of tubes 206 are laid. Each heat-exchange tube 261 is constituted by a coaxial pair of tubes, the inner tube being connected to the cooling fluid inlet 262 and the outer tube being connected to the cooling fluid outlet 263, the two tubes communicating with each other at their ends that are closer to the transverse wall 204.

The inlet temperature $t_{ee}$ and the outlet temperature $t_{se}$ of the cooling fluid (generally water) are measured at the inlet 262 and at the outlet 263, the flow-rate of the fluid $d_e$ being known.

A plurality of fluidization nozzles 271 may be disposed in line abreast transversely, the nozzles being connected to the manifold 272 via gas feed pipes 274. Inside the pipe 201, the fluidization gas feed pipes 274 are embedded in an extra thickness 221 of refractory material.

Figure 6:
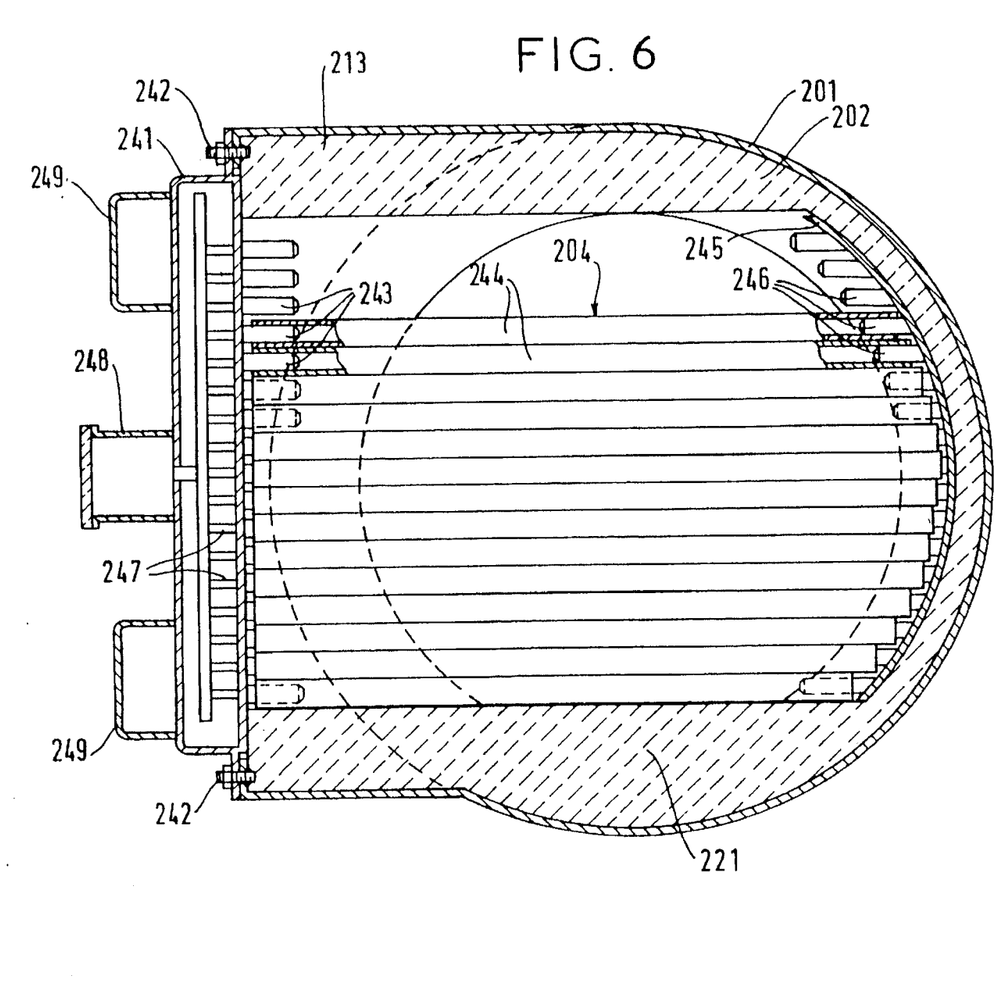
FIG. 6 is a section view on VII—VII of FIG. 4.

The retaining wall 204 is shown in more detail in FIG. 6.

At the place where the wall 204 is inserted, the pipe 201 has a side opening delimited by an extension portion 213 so that the opening is plane and rectangular. The wall 204, which is of the extractable drawer type, is inserted into the opening.

The wall includes an external portion 241 in the form of a cover which can abut against and be fixed to the extension portion 213 of the pipe 201, e.g. by screws 242. The external portion 241 supports the internal portion which constitutes the retaining wall itself. For this purpose, first tubular studs 243 are fixed to the external portion 241 so that they are in line abreast over the entire height of the inside volume of the pipe 201. Tubes 244 constituting superposed and removable elongate elements are engaged onto said first studs 243. The lengths of the tubes 244 are such that, at their other ends, they can be engaged on a rounded part 245 supporting correspondingly-disposed second tubular studs 246 in line abreast over the entire height of the inside volume of the pipe 201. Once a certain number of tubes 244 have been engaged on the external portion 241 and on the rounded part 245, and the wall 204 has been inserted into the pipe 201, the rounded part 245 abuts against the inside surface of the pipe 201.

Once the required height of the retaining wall 204 has been determined, so as to make the flow of particles cover the set of heat-exchange tubes, the number of tubes 244 to be installed is determined. Optionally, with operation of the device being stopped, and to enable optimum operation to be achieved for the cooling device, the transverse wall 4 is removed, the appropriate number of tubes 244 are installed by being engaged, and the wall 204 is re-installed so as to enable the cooling device to operate.

The external portion 241 is provided with channels 247 in which thermocouple wires are disposed enabling the temperature to be determined at a plurality of heights up retaining wall 204. To make such determination possible, the external portion is provided with an accessible external connection box 248 and handle means 249 for removing and installing the retaining wall 204.

A structure comprising tubes 244 and tubular studs 243 and 246 has been chosen because it is relatively simple and reliable to manufacture and to assemble. However, such an adjustable-height transverse wall may be made with superposed elements having a different shape.

The temperature measuring device 300 for measuring the temperature of the solids at the outlet of the tank 100 is shown in FIG. 4.

It is disposed upstream from the pipe 201 of the cooling device 200, and it includes three temperature measuring probes 301, 302, and 303 passing through the removal pipe 110. The probes are optionally disposed at different levels and are distributed around the periphery of the removal pipe 110 so that they are spaced apart from one another by 120°. They make it possible to determine the mean inlet temperature $t_{es}$ of the solids at the inlet of the cooling device 200.

The second temperature measuring device 400 for measuring the temperature of the solids 400 at the outlet of the cooling device 200 is also shown in FIG. 4.

It includes temperature-determination probes at a plurality of heights up the retaining wall 204. As described above, the probes are preferably thermocouple wires disposed in the tubes 244 and passing into the channels 247 in the external portion 241 of the retaining wall 204.

The second temperature measuring device further includes a temperature-determination probe 402 in the shape of an upside down T disposed downstream from said retaining wall 204 in an extension 401 of the pipe 201, which extension is provided with fluidization nozzles 403. These nozzles are organized in the same way as those of the cooling device 200. They pass through the bottom of the pipe extension 401 and are fed via a manifold 404 situated under the pipe extension 401. The fluidization gas is injected into the manifold 404 via an inlet 405. This additional fluidization makes it possible to homogenize the flow of solid particles in the pipe extension 401.

Optionally, a rectilinear other probe 406 may be disposed at the end of the pipe extension 401.

In this way, by means of the second temperature measuring device 400, it is possible to determine the mean outlet temperature $t_{ss}$ of the solid particles at the outlet of the cooling device 200.

By calculating the enthalpy balance, it is therefore possible to determine the flow-rate of solids passing through the cooling device 200. More precisely, this balance gives the following relationship:

$$d_s c_{ps}(t_{es}-t_{ss})=d_e c_{pe}(t_{se}-t_{ee})$$

where $d_s$ is the required flow-rate for the solid particles; $t_{es}$, $t_{ss}$, $d_e$, $t_{se}$, and $t_{ee}$ being measured as described above, and $c_{ps}$ and $c_{pe}$ being the specific heats (per unit mass) of the solid particles and of the cooling fluid.

An associated regulation system enables these calculations to be performed continuously.

Figure 7:
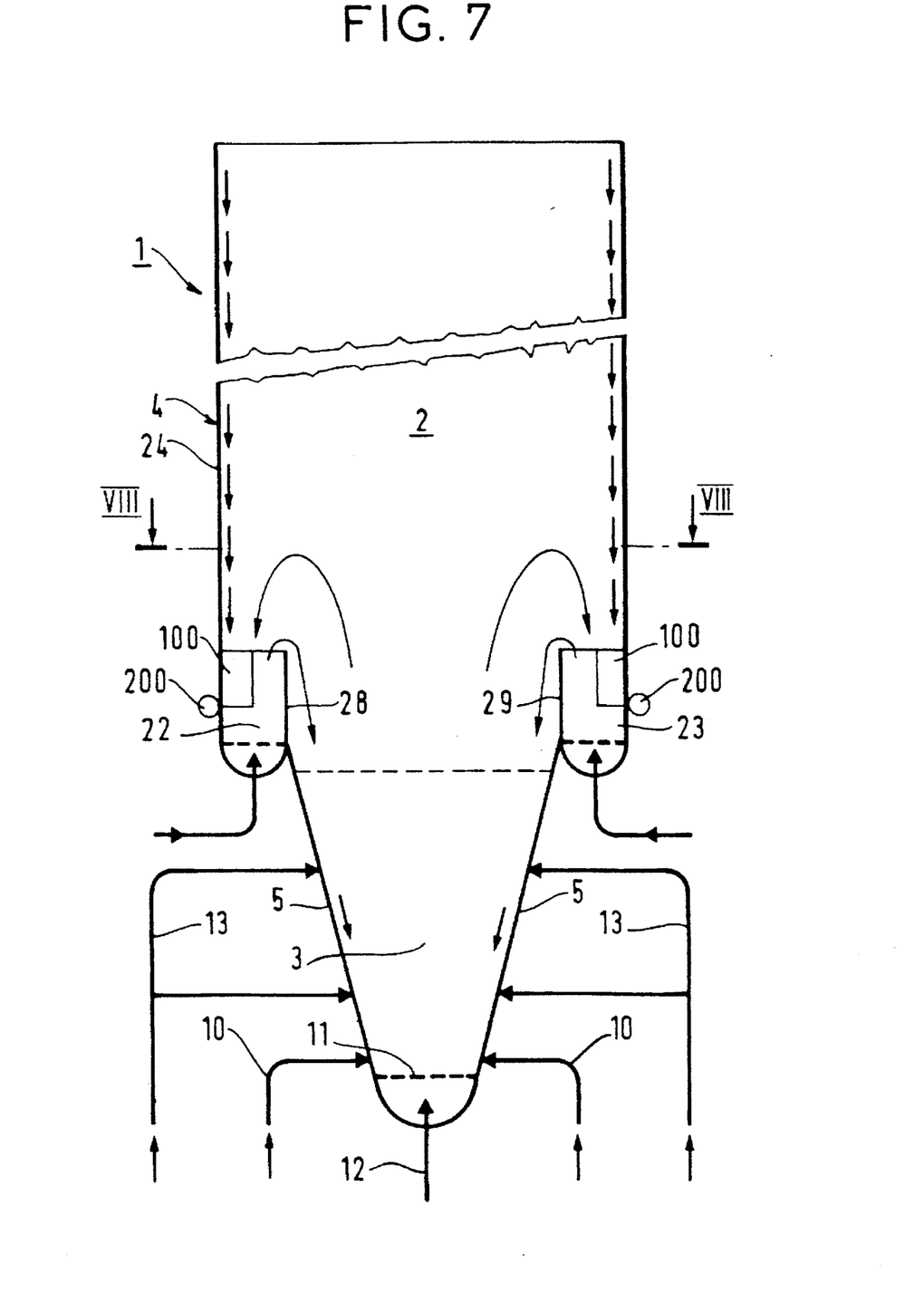
FIG. 7 is a vertical section view of a circulating fluidized bed reactor provided with internal beds and with devices of the invention.

It is possible to equip a reactor with at least one monitoring device as described above. It is known, e.g. from French Patent Application No. 2 690 512 filed by the Applicant, that a reactor may be provided with internal bubbling beds 22, 23 as shown in FIG. 7. The bubbling beds 22, 23 communicate with the inside of the reactor via their tops which receive the solid matter falling down along the walls 4 of the top zone 2, and return such solid matter in part to the bottom zone 3 by it overflowing over the entire lengths of walls acting as overflow walls or "weirs" 28, 29.

The bottom zone 3 is provided with a fluidization grate 11 that can be compartmentalized, and with primary air-injection means 12 below the grate 11. Secondary air-injection means 13 above the grate 11 and fuel-feed means 10 are also provided in a manner known per se. The walls 5 surrounding the bottom zone 3 are provided with heat-exchange tubes, and the top zone 2 is also surrounded by walls 4 provided with heat-exchange tubes.

Figure 8:
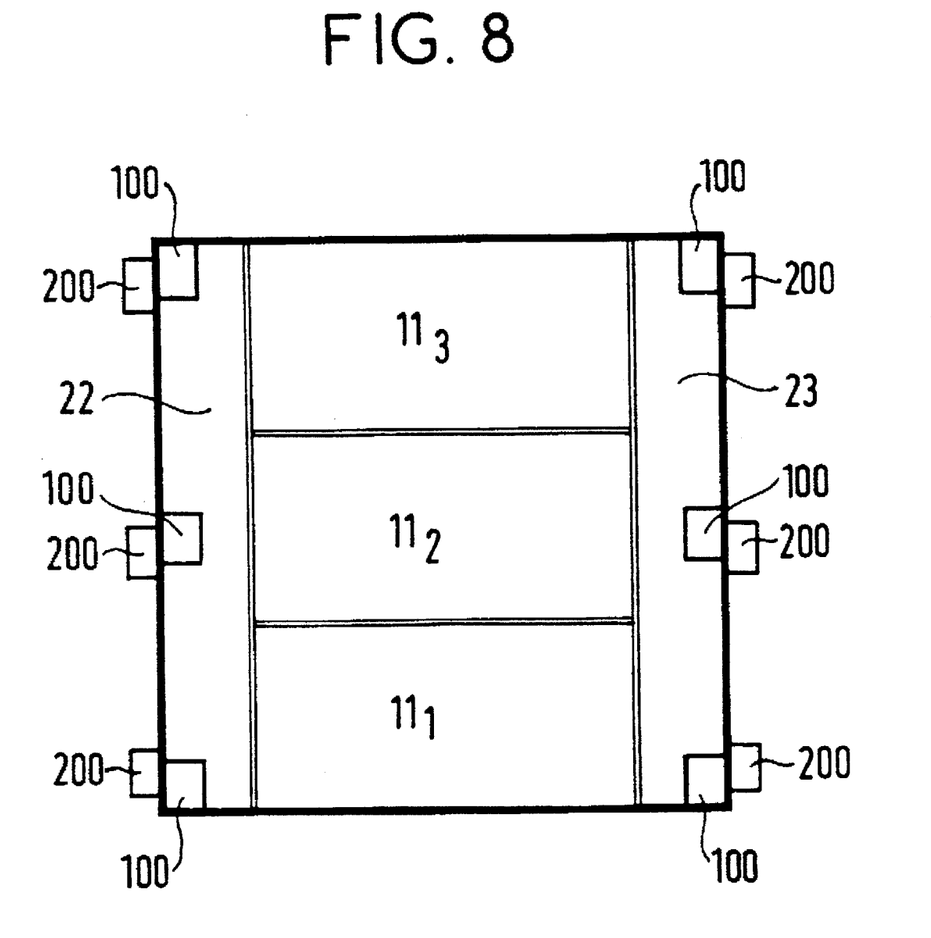
FIG. 8 is a section view on VIII—VIII of FIG. 7.

FIG. 8 is a horizontal section view of the reactor shown in FIG. 7. It is provided with a plurality of monitoring devices distributed over its inside periphery, the devices being disposed at the same height.

Naturally, a monitoring device of the invention may be installed at any place in the reactor where continuous monitoring of the internal circulation of the solid particles is required. Advantageously, as shown in FIGS. 7 and 8, such devices 100, 200 are placed on the side-walls, at each compartment of the fluidization grate.

For example, if the reactor is compartmentalized laterally into three compartments 111, 112, and 113 as shown in FIG. 8, three devices 100, 200 are disposed on each of the side-walls, so that there is one in each corner and one in the middle of each of the walls.

In this way, depending on the indications give by the monitoring devices, the longitudinal and transverse distribution of the gas feed to the compartments may be adjusted accordingly.

Advantageously, the monitoring devices are disposed on a horizontal plane above the internal beds 22, 23 or, as shown in FIGS. 7 and 8, at the level of the internal beds. In which case, each of the monitoring devices disposed on the side-walls of the reactor advantageously has its sampling tank 100 formed by a respective compartment of the corresponding internal bed 22, 23.

We claim:

1. In combination with a circulating fluidized bed reactor including a bottom zone into which a fluidization gas is injected, and a top zone surrounded by walls; a monitoring device for continuously monitoring the internal circulation flow-rate of solid particles in the circulating fluidized bed reactor by continuously and locally measuring the flow-rate of solids running down along said walls, said monitoring device comprising:

a sampling tank for sampling internal circulation solids, which tank is fixed against one of said walls of said reactor and is provided with fluidization means;

a measuring device which measures the flow-rate of said solids;

a removal pipe for removing said solids from said tank and conveying them to said measuring device for measuring the flow-rate of said solids; and a return pipe for returning said solids from said measuring device to an inside of said reactor.

2. The combination according to claim 1, wherein said measuring device for measuring the flow-rate is disposed outside said reactor.

3. The combination according to claim 2, wherein said measuring device comprises:

a first temperature measuring device for measuring the temperature of said solids at an output of the sampling tank;

a cooling device for cooling the solids; and a second temperature measuring device for measuring the solids at an output of the cooling device.

4. The combination according to claim 3, further comprising a sloping pipe having a top and a bottom and which slopes downwards, which has a longitudinal axis x—x, which is provided with a lining of refractory material, which receives solid particles at said top from said removal pipe, and which includes therein a cooling facility, said cooling facility comprising a set of heat-exchange tubes through which a cooling fluid flows and an air-feed assembly enabling the solid particles to flow, wherein said sloping pipe slopes at at least 5 degrees relative to a horizontal plane and constitutes a solid-receiving tank.

5. The combination according to claim 4, wherein said sloping pipe slopes at an angle in the range of 5 degrees to 20 degrees.

6. The combination according to claim 4, wherein the set of heat-exchange tubes comprises tubes that are disposed parallel to the axis x—x in the sloping pipe.

7. The combination according to claim 4, wherein said sloping pipe is provided with a retaining wall for retaining solid particles, said retaining wall being situated downstream from the set of heat-exchange tubes.

8. The combination according to claim 7, wherein said retaining wall is a transverse wall that is extractable.

9. The combination according to claim 8, wherein said retaining wall is made up of superposed elongate elements that are removable.

10. The combination according to claim 6, wherein the heat-exchange tubes are coaxial pairs of tubes having an inlet and an outlet for the cooling fluid, both the inlet and the outlet for the cooling fluid being situated at the same end of the sloping pipe.

11. The combination according to claim 4, wherein the air-feed assembly comprises nozzles passing through the bottom of the sloping pipe and fed via a compartmentalized manifold situated under the sloping pipe.

12. The combination according to claim 7, wherein said second temperature measuring device comprises:

temperature-determination probes at a plurality of heights up said retaining wall; and a temperature-determination probe disposed downstream from said retaining wall in an extension of the sloping pipe, said extension being provided with fluidization nozzles.

13. The combination according to claim 1, wherein said reactor includes a plurality of monitoring devices distributed over an inside periphery if the reactor, the monitoring devices being disposed at the same height.

14. The combination according to claim 13, further including internal bubbling beds communicating with the inside of the reactor via their tops which receive solid matter falling down along the walls of the top zone, and which return the solid matter in part to the bottom zone by overflowing over the entire lengths of walls acting as overflow walls, wherein at least some of the monitoring devices have their respective sampling tanks formed by respective compartments of the internal beds.

15. A method of continuously monitoring the internal circulation flow-rate of solid particles in a circulating fluidized bed reactor including a bottom zone into which a fluidization gas is injected, and a top zone surrounded by walls, by continuously and locally measuring the flow-rate of solids running down along the walls, said method comprising:

sampling internal circulation solids in a sampling tank, which tank is fixed against one of the walls of the reactor and is provided with fluidization means;

removing said solids from said tank and conveying said solids through a removal pipe to a measuring device;

measuring the flow-rate of said solids; and returning said solids from the measuring device to an inside of the reactor through a return pipe.

* * * * *